United States Patent
Yoo et al.

(10) Patent No.: US 10,366,532 B2
(45) Date of Patent: Jul. 30, 2019

(54) METHOD AND APPARATUS FOR PERFORMING PATH RENDERING

(71) Applicant: SAMSUNG ELECTRONICS CO., LTD., Suwon-si, Gyeonggi-Do (KR)

(72) Inventors: Jeongjoon Yoo, Hwaseong-si (KR); Krishnadasan Sundeep, Karnataka (IN); Jaedon Lee, Yongin-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 16 days.

(21) Appl. No.: 15/461,109

(22) Filed: Mar. 16, 2017

(65) Prior Publication Data

US 2017/0294043 A1 Oct. 12, 2017

(30) Foreign Application Priority Data

Apr. 6, 2016 (KR) .................. 10-2016-0042387

(51) Int. Cl.
*G06T 17/00* (2006.01)
(52) U.S. Cl.
CPC ................... *G06T 17/005* (2013.01)
(58) Field of Classification Search
CPC ....................................................... G06T 17/20
See application file for complete search history.

(56) References Cited

U.S. PATENT DOCUMENTS

| | | | |
|---|---|---|---|
| 6,961,067 B2 | 11/2005 | Moore | |
| 7,289,119 B2 | 10/2007 | Heirich et al. | |
| 7,483,036 B2 | 1/2009 | Moore | |
| 2003/0179203 A1* | 9/2003 | Bruderlin | G06T 13/40 345/473 |
| 2013/0163053 A1* | 6/2013 | Wang | H04N 1/4051 358/3.06 |
| 2013/0301871 A1 | 11/2013 | Kirmse et al. | |
| 2014/0043342 A1* | 2/2014 | Goel | G06T 9/00 345/501 |
| 2014/0184606 A1 | 7/2014 | De Richebourg et al. | |
| 2015/0077420 A1* | 3/2015 | Bolz | G06T 11/203 345/442 |
| 2015/0269773 A1 | 9/2015 | Pearson et al. | |
| 2015/0310636 A1 | 10/2015 | Yoo et al. | |
| 2016/0042561 A1 | 2/2016 | Yoo et al. | |

FOREIGN PATENT DOCUMENTS

| | | |
|---|---|---|
| JP | 2001307115 | 11/2001 |
| JP | 2002133431 | 5/2002 |
| JP | 2004318832 | 11/2004 |
| KR | 1020150109276 | 10/2015 |
| KR | 1020150122519 | 11/2015 |

OTHER PUBLICATIONS

Bruce F. Naylor, "A Tutorial on Binary Space Partitioning Trees", Computer Games Developer Conference Proceedings (1998), pp. 1-25.

(Continued)

*Primary Examiner* — Phi Hoang
(74) *Attorney, Agent, or Firm* — F. Chau & Associates, LLC

(57) ABSTRACT

A method of rendering an object including a path formed by a primitive includes: generating a tree corresponding to spaces partitioned by the primitive; selecting a pixel from the partitioned spaces; and acquiring a winding number of the selected pixel by detecting the tree.

19 Claims, 23 Drawing Sheets

(56) References Cited

OTHER PUBLICATIONS

Mark J. Kilgard, et al., "GPU-Accelerated Path Rendering", SIGGRAPH Asia 2012, Computer Graphics Proceedings, Annual Conference Series, 2012, pp. 1-10.

Francisco Ganacim, et al., "Massively-Parallel Vector Graphics", ACM Transactions on Graphics, vol. 33, No. 6, Article 229, Publication Date: Nov. 2014, pp. 1-14.

* cited by examiner

METHOD AND APPARATUS FOR PERFORMING PATH RENDERING

CROSS-REFERENCE TO RELATED APPLICATIONS

This application claims the benefit under 35 USC 119(a) of Korean Patent Application No. 10-2016-0042387 filed on Apr. 6, 2016 in the Korean Intellectual Property Office, the entire disclosure of which is incorporated herein by reference for all purposes.

BACKGROUND

1. Field

The following description relates to methods and apparatuses for performing path rendering.

2. Description of Related Art

Studies have been conducted on methods to increase the acceleration performance of graphic processing units (GPUs) when vector graphics or path rendering is performed. In order to accelerate rendering of three-dimensional graphics, a hardware structure of a GPU is designed based on the assumption that all pieces of input data are configured as a triangle. However, for path rendering, input data is not configured as triangles, but is configured as a combination of commands and vertexes. Accordingly, it is difficult to increase the acceleration performance of a GPU when performing path rendering.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of rendering an object including a path formed by a primitive includes: generating a tree corresponding to spaces partitioned by the primitive; selecting a pixel from the partitioned spaces; and acquiring a winding number of the selected pixel by detecting the tree.

The acquiring of the winding number of the selected pixel may include: detecting, based on location information of the selected pixel, the tree until a leaf node is reached; and acquiring a winding number allocated to the leaf node.

The acquiring of the winding number allocated to the leaf node may include: computing a winding number of the selected pixel; and allocating the computed winding number to the leaf node.

The detecting of the tree may include detecting, based on location information of the selected pixel, a node corresponding to a space including the selected pixel.

The generating of the tree may include generating a binary space partitioning tree (BSP Tree) corresponding to the spaces partitioned by the primitive.

The generating of the tree may include: partitioning a space including the object based on a first primitive in the primitive; generating a node corresponding to the first primitive; and adding the node to the tree.

The generating of the tree may include, in response to the partitioned space excluding another primitive: generating a node corresponding to the partitioned space; and adding the node corresponding to the partitioned space to the tree.

The method may further include: computing a winding number of an arbitrary pixel from the partitioned space; and allocating the winding number of the arbitrary pixel to the node corresponding to the partitioned space.

The method may further include: determining whether to perform rendering with respect to the selected pixel based on the acquired winding number.

A non-transitory computer-readable medium may store instructions that, when executed by a processor, cause the processor to perform the method.

In another general aspect, a rendering apparatus to render an object including a path formed by a primitive includes: a tree generator configured to generate a tree corresponding to spaces partitioned by the primitive; a selector configured to select a pixel from the partitioned spaces; and a detector configured to acquire a winding number of the selected pixel by detecting the tree.

The detector may be further configured to detect the tree until a leaf node is reached and acquire a winding number allocated to the leaf node based on location information of the selected pixel.

The rendering apparatus may further include: a computation processor configured to allocate the winding number to the leaf node by computing a winding number of the selected pixel and allocating the computed winding number to the leaf node.

The detector may be further configured to detect a node corresponding to a space including the selected pixel based on location information of the selected pixel.

The rendering apparatus may further include: a central processing unit (CPU) including any one or any combination of two or more of a tree generator, a selector, a detector, and a computation processor.

The rendering apparatus may further include: a GPU including any one or any combination of two or more of a tree generator, a selector, a detector, and a calculator.

The tree generator may be further configured to partition a space including an object according to a first primitive in the primitive, generate a node corresponding to the first primitive, and add the node to the tree.

The tree generator may be further configured to generate a node corresponding to the partitioned space and add the node corresponding to the partitioned space to the tree in response to the partitioned space excluding another primitive.

The rendering apparatus may further include: a computation processor configured to compute a winding of an arbitrary pixel from the partitioned space and allocate the winding number of the arbitrary pixel to the node corresponding to the partitioned space.

The rendering apparatus may further include: a rendering processor configured to determine whether to perform rendering with respect to the selected pixel based on the acquired winding number.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

In the following description, a path may be an element that constitutes a target (for example, an object) to be rendered by a rendering apparatus. In an example, the path is a straight line or a curved line connecting one point to another point, and the object includes a closed polygon or a closed path formed by connecting one or more paths.

Figure 1:
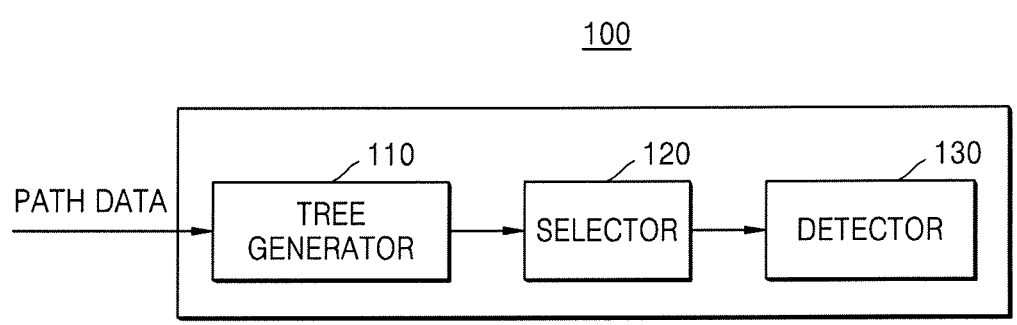
FIG. 1 is a block diagram of a rendering apparatus, according to an embodiment.

FIG. 1 is a block diagram of a rendering apparatus 100, according to an embodiment. Referring to FIG. 1, the rendering apparatus 100 includes a tree generator 110, a selector 120, and a detector 130. The rendering apparatus 100 depicted in FIG. 1 illustrates example elements related to the disclosed embodiment. Accordingly, the rendering apparatus 100 may include additional elements besides the elements depicted in FIG. 1.

Each of the tree generator 110, the selector 120, and the detector 130 of the rendering apparatus 100 of FIG. 1 may be formed as one or a plurality of processors. Each processor may include an array of a plurality of logic gates or a combination of a general microprocessor and a memory device storing a program that may be executed by the microprocessor. Also, each processor may be embodied in a different form of hardware.

For example, the tree generator 110 and the selector 120 are implemented as one or a plurality of processors included in a central processing unit (CPU). The detector 130 may be implemented as one or a plurality of processors included in a graphic processing unit (GPU).

As another example, each of the tree generator 110, the selector 120, and the detector 130 are implemented as one or a plurality of processors included in a CPU. Also, each of the tree generator 110, the selector 120, and the detector 130 may be implemented as one or a plurality of processors included in a GPU.

With regard to an operation of the rendering apparatus 100, when an object that includes a path is rendered, the tree generator 110 generates trees corresponding to spaces partitioned by primitives. The tree generator 110 may generate binary space partitioning trees (BSP Trees) corresponding to the spaces partitioned by the primitives.

The tree generator 110 partitions a space including an object based on one of the primitives that include part or all of a path included in the object. The primitives do not necessarily correspond to a target that is the same as the path included in the object. The primitives may denote part or all of a path included in an object. Also, the primitives may include an extension line of a path included in an object.

In an example, a path included in an object includes primitives. The tree generator 110 partitions a space including an object into two spaces by selecting one of the primitives. The tree generator 110 generates a node corresponding to the one of the primitives and adds the node to a tree. The tree generator 110 adds the node corresponding to one of the primitives to a tree as an inner node.

When another primitive is included in a space partitioned by the primitives, the tree generator 110 re-partitions the partitioned space into two spaces by selecting one of the primitives included in the partitioned spaces. When no other primitive is included in the space partitioned by the primitives, the tree generator 110 generates nodes corresponding to the partitioned spaces and adds the generated nodes to the tree. The tree generator 110 adds the node corresponding to the partitioned space to the tree as a leaf node. A leaf node may denote a node that does not have a child node and may be used for allocating a winding number.

The selector 120 selects at least one pixel from the partitioned spaces. For example, the selector 120 generates a sample for rendering and determines a range of spaces including an object. For example, a space including an object denotes a total frame or a bounding box including an object. The selector 120 generates a sample in a determined space by selecting at least one pixel from the determined space. The sample is a set of pixels including at least one pixel for performing rendering. The rendering apparatus 100 may process the selected pixel(s) in parallel based on the generated sample.

The detector 130 acquires a winding number of the selected pixel by detecting a tree. The detector 130 may detect the tree until a leaf node is reached based on location information of the selected pixel. The detector 130 acquires a winding number allocated to the detected leaf node.

The detector 130 detects a node corresponding to a space including a pixel based on location information of the pixel. For example, the detector 130 determines a space among the partitioned spaces including a pixel based on the primitives.

Each of the inner nodes of a tree may correspond to a respective one of the primitives that partition a space that includes an object. The detector 130 acquires a location relationship between each of the primitives according to coordinates of the pixel. Accordingly, the detector 130 detects a node corresponding to a space including a pixel of the partitioned space based on the primitives.

An operation of the rendering apparatus 100 will be described with reference to FIG. 2.

Figure 2:
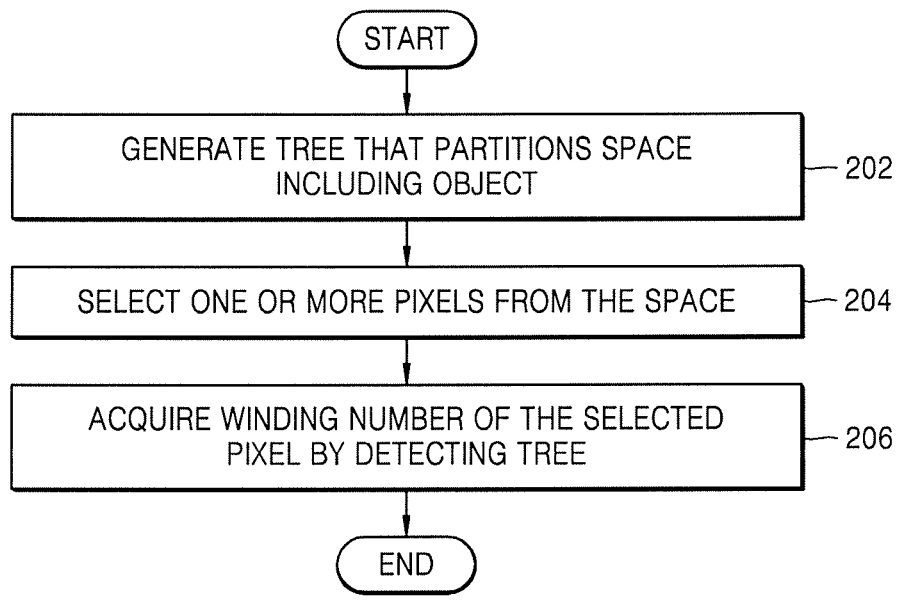
FIG. 2 is a flowchart of a method of performing path rendering, according to an embodiment.

FIG. 2 is a flowchart of a method of performing path rendering according to an embodiment. The method of performing path rendering illustrated in FIG. 2 includes operations that are time-sequentially processed by the rendering apparatus 100 of FIG. 1. Accordingly, although some descriptions with respect to the method of rendering of FIG. 2 are omitted, the descriptions with respect to the rendering apparatus 100 of FIG. 1 are included in the description of the method of FIG. 2.

Referring to FIG. 2, in an operation 202, the rendering apparatus 100 generates a tree corresponding to spaces partitioned by primitives. More specifically, the rendering apparatus 100 may generate a binary space partitioning tree (BSP Tree) corresponding to the spaces partitioned by the primitives. The rendering apparatus 100 partitions a space that includes an object based on one of the primitives including part or all paths included in the object.

The rendering apparatus 100 generates a node corresponding to a primitive and stores the node in the tree. Also, when no other primitive is included in a partitioned space, the rendering apparatus 100 generates a node corresponding to the partitioned space and stores the node in a tree.

In an operation 204, the rendering apparatus 100 selects one or more pixels included in a partitioned space. The rendering apparatus 100 may process the selected one or more pixels in parallel.

In an operation 206, the rendering apparatus 100 acquires a winding number of a pixel selected by detecting the tree. More specifically, the rendering apparatus 100 may acquire a winding number allocated to a leaf node by detecting the tree until a leaf node is reached based on location information of a pixel.

The winding number may be a predetermined value indicating the number of path rotations that occurred during rendering of a path with respect to one side of a particular pixel. When a path rotates in a clockwise direction, the winding number may be computed by increasing the predetermined value, and when the path rotates in a counterclockwise direction, the winding number may be computed by decreasing the predetermined value. Also, the winding number may be computed in an opposite way. That is, when the path rotates in a clockwise direction, the winding number may be computed by decreasing the predetermined value, and when the path rotates in a clockwise direction, the winding number may be computed by increasing the predetermined value. The predetermined value may be an integer, but the predetermined value is not limited to being an integer.

In order to compute a winding number, the rendering apparatus 100 may draw a virtual half-line from a location of a specific pixel towards a side of the specific pixel. The rendering apparatus 100 may compute a winding number according to a direction of drawing a primitive at a point where the virtual half-line crosses a path.

As an example, when a path rotates once in a clockwise direction, the winding number of a pixel is +1, and when the path rotates once in a counterclockwise direction, the winding number of the pixel is −1. In this case, when a primitive at a point where a virtual half-line and a path crosses is drawn in a downward direction, the winding number of the pixel is +1. Also, when a primitive at a point where a virtual half-line and a path crosses is drawn in an upward direction, the winding number of the pixel is −1.

As another example, when a path rotates once in a clockwise direction, the winding number of a pixel is −1, and when the path rotates once in a counterclockwise direction, the winding number is +1. In this case, when a primitive at a point where a virtual half-line and a path crosses is drawn in a downward direction, the winding number of the pixel is −1. Also, when a primitive at a point where a virtual half-line and a path crosses is drawn in an upward direction, the winding number of the pixel is +1.

Hereinafter, for convenience of explanation, it is assumed that the winding number is +1 when a path rotates once in a clockwise direction and the winding number is −1 when the path rotates once in a counterclockwise direction. The winding number is described in detail with reference to FIG. 3.

Figure 3:
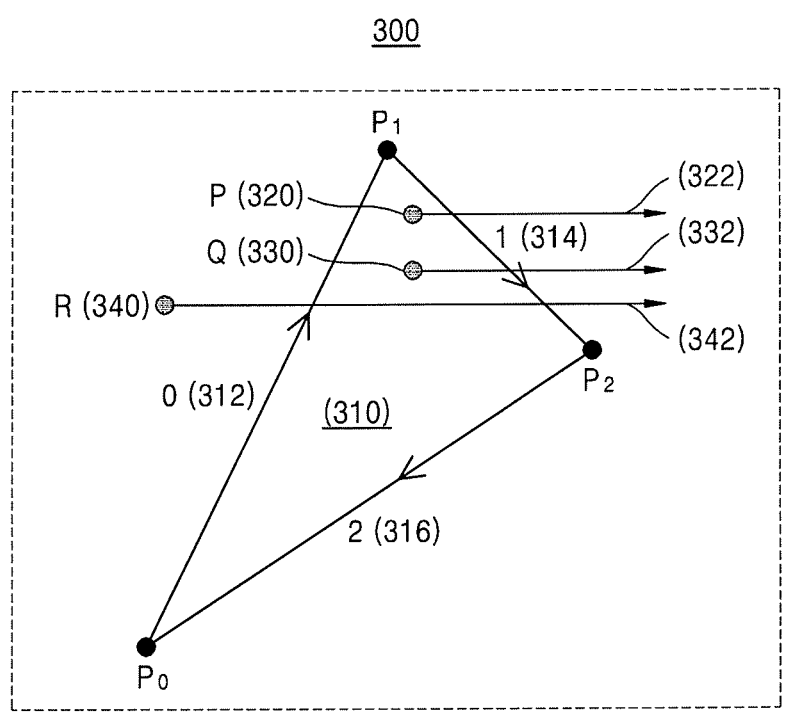
FIG. 3 is a drawing for explaining a winding number, according to an embodiment.

FIG. 3 is a drawing for explaining a winding number, according to an embodiment. More specifically, FIG. 3 shows an example of a winding number corresponding to a pixel P 320 of among pixels included in a space including a path 310.

Referring to FIG. 3, the closed path 310 is drawn with respect to the pixel P (320), a pixel Q (330), a pixel R (340). If a virtual half-line 322 is drawn in a right horizontal direction from the pixel P (320), the virtual half-line 322 and the path 310 crosses at a primitive 1 (314). Accordingly, a winding number of the pixel P 320 may be determined based on a direction in which the primitive 1 (314) is drawn. In detail, the primitive 1 (314) is drawn in a downward direction at the point where the virtual half-line 322 and the primitive 1 (314) cross each other. Accordingly, the winding number on the pixel P (320) is +1.

Likewise, when a virtual half-line 332 is drawn in a right horizontal direction from the pixel Q 330, the virtual half-line 332 and the path 310 crosses at the primitive 1 (314). Since the direction of the primitive 1 (314) is downwardly drawn, the winding number of the pixel Q (330) is +1.

When a virtual half-line 342 is drawn in a right horizontal direction from the pixel R (340), the virtual half-line 342 and the path 310 crosses at a primitive 0 (312) and the primitive 1 (314). Since the primitive 0 (312) is upwardly drawn and the primitive 1 (314) is downwardly drawn, the winding number of the pixel R 340 is −1++1=0.

According to the above descriptions with reference to FIG. 3, although the winding number of the pixel P (320) is described as being computed by considering that the path 310 is located at the right side of the pixel P (320), the disclosure is not limited to this example. That is, the winding number of the pixel P (320) may be computed by considering that the path 310 is located at one of left, right, upper, and lower sides with respect to the position of the pixel P 320. Also, the rendering apparatus 100 may compute a winding number of a pixel by arbitrarily partitioning the space 300 including the path 310 and by changing the direction of the virtual half-line 342 in the partitioned spaces.

The rendering apparatus 100 may compute a winding number via a plurality of threads. A single thread may be used for computing a winding number of a pixel. At this point, a plurality of the threads may be processed in parallel, and the rendering apparatus 100 may compute winding numbers with respect to each of the pixels via the plurality of the threads. Accordingly, the rendering apparatus 100 may perform path rendering at a high speed.

Referring to FIG. 3, the pixel P 320 and the pixel Q 330 have the same winding number. Likewise, all pixels included in an inner side of a space surrounded by the path 310 have the same winding number. It is inefficient to compute the winding numbers of all pixels having the same winding number. Accordingly, the rendering apparatus 100 may classify the pixels having the same winding number to a group on the basis of a tree.

The rendering apparatus 100 may compute only one winding number with respect to a pixel of a group and may store the computed winding number via a tree. Afterwards, the rendering apparatus 100 may acquire an already computed winding number by detecting the tree. Accordingly, the rendering apparatus 100 may reduce the number of computations for computing the winding numbers. Hereinafter, a method of generating a tree will be described in detail with reference to FIG. 4.

Figure 4:
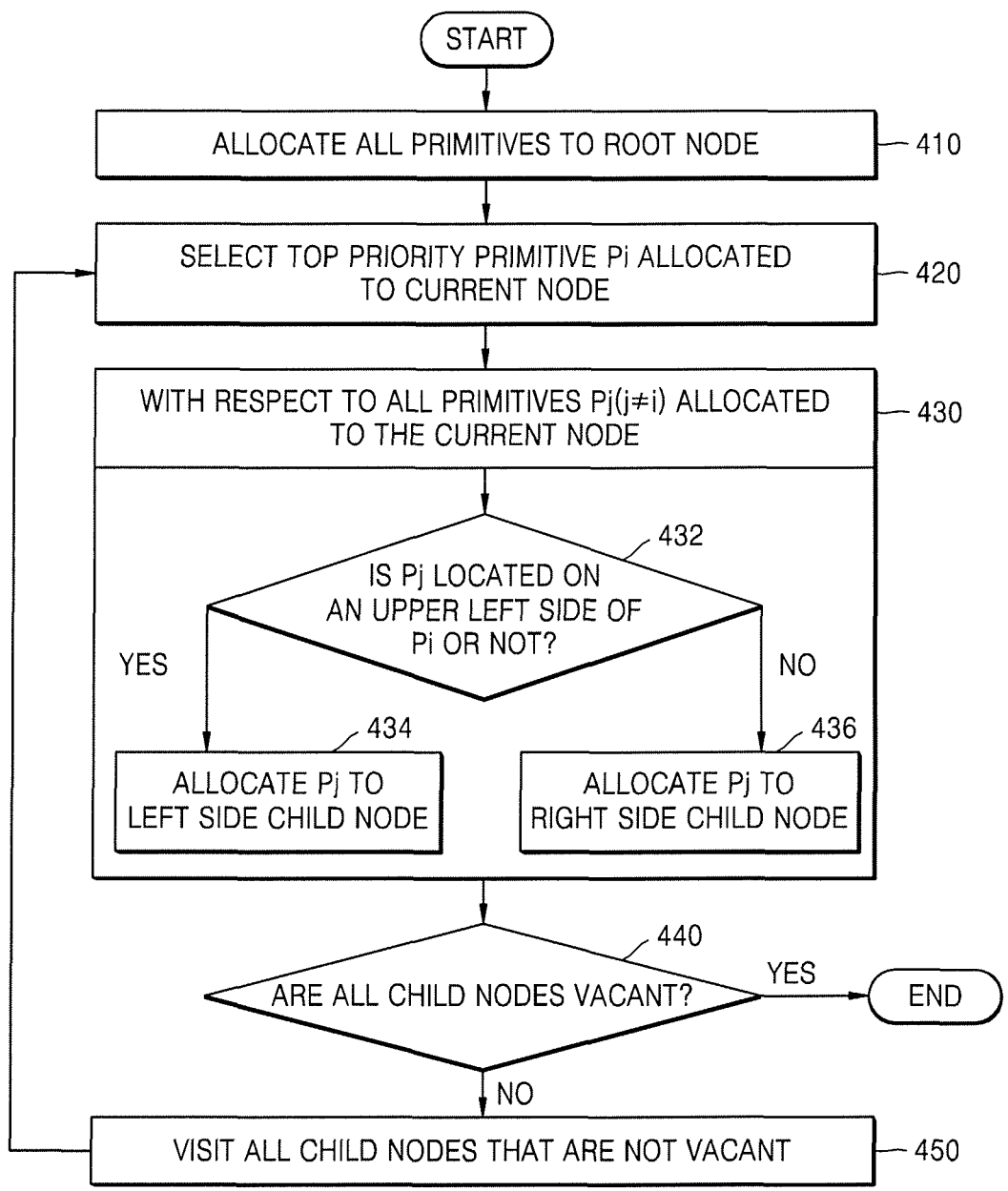
FIG. 4 is a flowchart of a method of generating a tree corresponding to spaces partitioned by primitives, according to an embodiment.

FIG. 4 is a flowchart of a method of generating a tree corresponding to spaces partitioned by primitives, according to an embodiment.

Referring to FIG. 4, in an operation 410, the rendering apparatus 100 may generate a root node and may allocate all primitives included in a path to the root node. In an operation 420, the rendering apparatus 100 selects a top priority primitive Pi allocated to the current node. For example, the current node is the root node. The top priority primitive Pi may be determined according to a predetermined rule or may be randomly determined. The method of determining the top priority primitive Pi is not specifically limited.

For convenience of explanation, it is assumed that a primitive having the lowest number is the top priority primitive Pi. As an example, n primitives having numbers of 0 through n are included in a path. When the current node is the root node, the rendering apparatus 100 selects the primitive 0 as the top priority primitive Pi. That is, i may be 0. Hereinafter, each operation will be described based on the foregoing example.

In an operation 430, the rendering apparatus 100 determines a location relationship between all primitives allocated to the current node except for the top priority primitive P0 and the top priority primitive Pi. The rendering apparatus 100 classifies the primitives based on the location relationship with the top priority primitive Pi.

In an operation 432, the rendering apparatus 100 determines whether the location of a primitive Pj (j=1 through n−1) is on an upper left side or a lower right side of the top priority primitive Pi. However, the direction indicated in FIG. 4 in order to determine the location relationship of the primitives with respect to the top priority primitive Pi is just an example, and thus, the method of determining a location relationship is not limited to the described direction.

The upper left side of the primitive denotes a left direction of the primitive. However, when the primitive is a horizontal line, left and right directions may not be determined, and thus, an upper direction of the primitive is regarded as the upper left side. Likewise, a lower right side of the primitive denotes a right direction of the primitive. However, when the left and right directions are not determined, a lower side of the primitive is regarded as a lower right side of the primitive.

If the primitive Pj is located on an upper left side of the top priority primitive Pi, the rendering apparatus 100 allocates the primitive Pj to a child node on a left side of the current node in an operation 434. If the primitive Pj is located on a lower right side of the top priority primitive Pi, the rendering apparatus 100 allocates the primitive Pj to a child node on a right side of the current node in an operation 436. The operation 430 is performed with respect to all primitives except for the top priority primitive Pi. The tree proposed in this disclosure is just an example, and thus, it should be understood that the tree may be embodied in many different forms.

In an operation 440, the rendering apparatus 100 determines whether all child nodes are vacant or not. The vacant node may denote that there is no primitive passing through the vacant node. For example, the rendering apparatus 100 determines that primitives allocated to the child nodes exist. If there are no more primitives allocated to the child nodes, the rendering apparatus 100 terminates the generation of a tree. Vacant nodes may respectively correspond to partitioned spaces and may be used for allocating winding numbers of pixels included in each of the partitioned space. Each of the vacant nodes included in a tree may be leaf nodes.

If a child node of the left and right child nodes is not a vacant node, in an operation 450, the rendering apparatus 100 visits all of the child nodes that are not vacant. When the rendering apparatus 100 visits the child nodes that are not vacant, the rendering apparatus 100 time-sequentially re-performs the operations 420 and 450 by considering the visited child nodes as current nodes. Hereinafter, an example of generating a tree will be described in detail with reference to FIGS. 5A through 5D.

FIGS. 5A through 5D are drawings for explaining the generation of a tree corresponding to spaces partitioned by primitives, according to an embodiment.

Figure 5A:
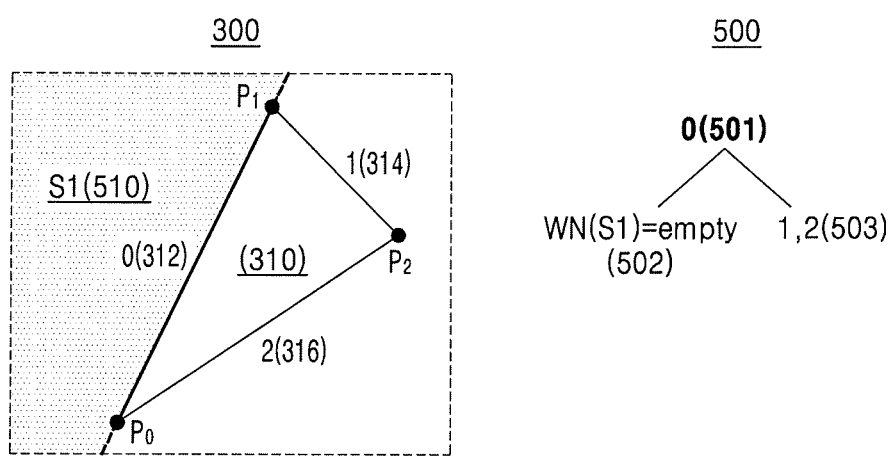
FIGS. 5A through 5D are drawings for explaining generation of a tree corresponding to spaces partitioned by primitives, according to an embodiment.

Referring to FIG. 5A, the rendering apparatus 100 sets a space 300 including a path 310. The space 300 may denote a total frame or a bounding box that includes the path 310.

The rendering apparatus 100 allocates primitives 0 through 2 (312, 314, and 316) to a root node 501 of a tree 500. The rendering apparatus 100 selects the primitive 0 (312) as the top priority primitive. Accordingly, the root node 501 corresponds to the primitive 0 (312).

The rendering apparatus 100 determines a location relationship between the other primitives 1 (314) and 2 (316) and the primitive 0 (312). The rendering apparatus 100 allocates the primitive located on an upper left side of the primitive 0 (312) to a child node 502 on a left side of the root node 501. Since there is no primitive in the node 502 located on an upper left side of the primitive 0 312, the rendering apparatus 100 sets the node 502 as a vacant node. Accordingly, the node 502 corresponds to a space S1 (510), which is a space partitioned by the primitive 0 (312). Also, the node 502 is used to allocate winding numbers of pixels included in the space S1 510.

The rendering apparatus 100 allocates a primitive located on a lower right side of the primitive 0 (312) to a child node 503 on a right side of the root node 501. Accordingly, the rendering apparatus 100 allocates the primitive 1 (314) and the primitive 2 (316) located on a lower right side of the primitive 0 (312) to the node 503. In this case, the node 503 corresponds to remaining spaces partitioned by the primitive 0 (312) other than the space S1 (510).

Figure 5B:
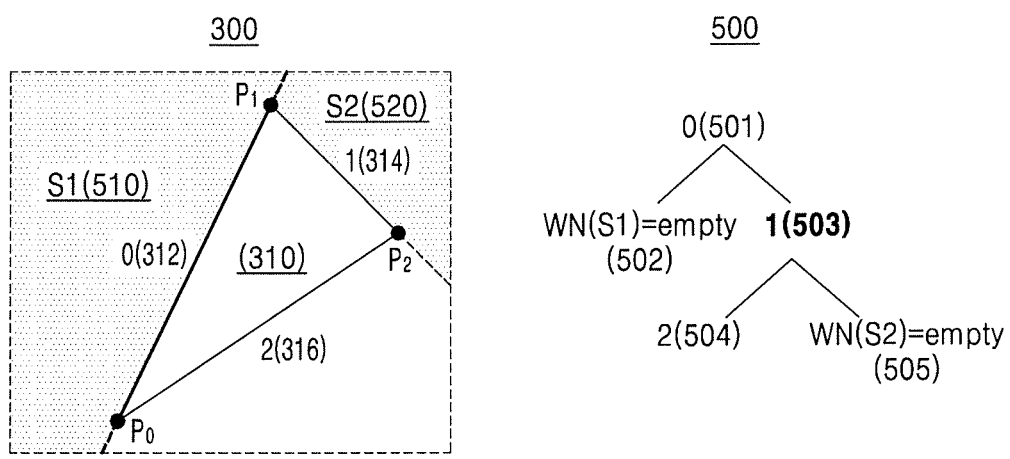

Referring to FIG. 5B, the rendering apparatus 100 performs the same operation described with reference to FIG. 5A with respect to a sub-tree for which the node 503 is a root node. That is, the rendering apparatus 100 performs a tree generation operation based on the node 503 as a current node. The rendering apparatus 100 selects the primitive 1 (314) as the top priority primitive. Accordingly, the node 503 corresponds to the primitive 1 (314).

The rendering apparatus 100 determines a location relationship between the primitive 2 (316) and the primitive 1

(314). Since the primitive 2 (316) is located on a left side of the primitive 1 (314), the rendering apparatus 100 allocates the primitive 2 (316) to a node 504 on a left side of the current node 503.

Since there is no primitive on a right side of the primitive 1 314, a child node 505 on a right side of the current node 503 is a vacant node. Accordingly, the node 505 corresponds to a space S2 (520), which is a space partitioned by the primitive 1 314. Also, the node 505 is used for allocating winding numbers of pixels included in the space S2 (520).

Figure 5C:
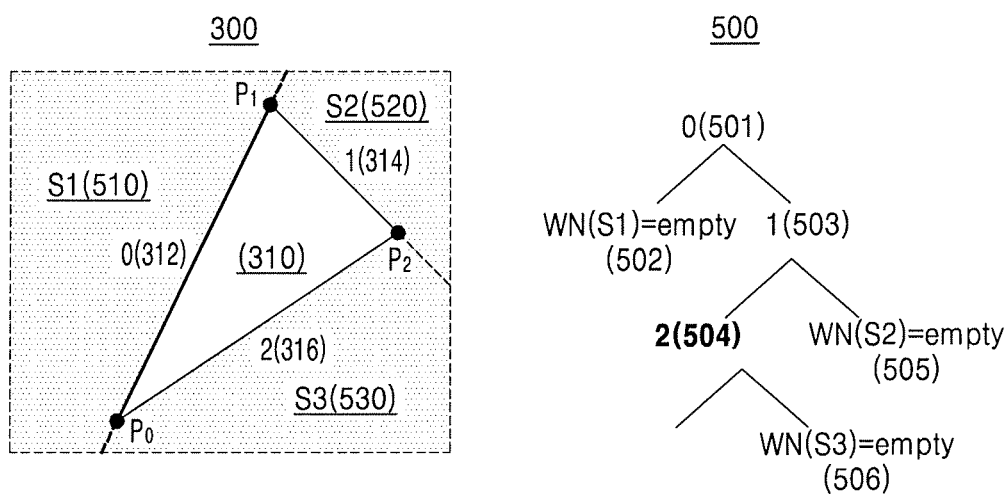

Referring to FIG. 5C, the rendering apparatus 100 performs an operation of generating a tree based on the node 504 as a current node. The rendering apparatus 100 sets the primitive 2 (316) as the top priority primitive. Since no primitive is allocated on a right side of the primitive 2 (316), a child node 506 on a right side of the current node 504 is a vacant node. Accordingly, the node 506 corresponds to a space S3 (530), which is a space partitioned by the primitive 2 (316), and is used to allocate winding numbers of pixels included in the space S3 (530).

Figure 5D:
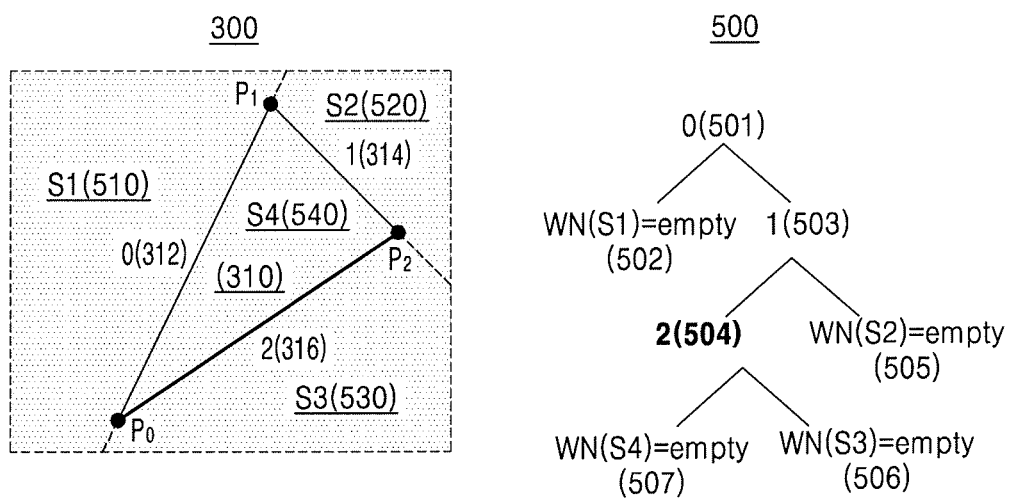

Referring to FIG. 5D, since there is no primitive on a left side of the primitive 2 (316), a child node 507 on a left side of the current node 504 is a vacant node. Accordingly, the node 507 corresponds to a space S4 (540), which is a space partitioned by the primitive 2 316, and is used for allocating winding numbers of pixels included in the space S4 (540). Since the child node 507 and the child node 506 on a left side of the current node 504 are vacant, the rendering apparatus 100 terminate the generation of the tree 500.

Figure 6:
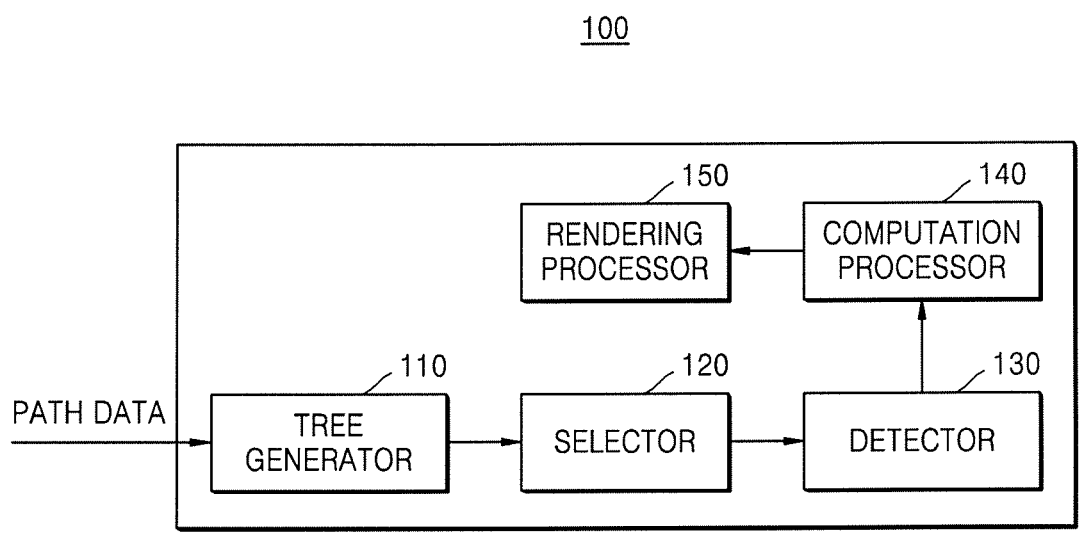
FIG. 6 is a block diagram of a rendering apparatus, according to another embodiment.

FIG. 6 is a block diagram of a configuration of a rendering apparatus 100' according to another embodiment.

Referring to FIG. 6, the rendering apparatus 100' includes include a tree generator 110, a selector 120, a detector 130, a computation processor 140, and a rendering processor 150. The rendering apparatus 100' may additionally include elements other than the elements depicted in FIG. 6.

Descriptions with respect to the rendering apparatus 100 of FIG. 1 may apply to the rendering apparatus 100' of FIG. 6. The tree generator 110, the selector 120, and the detector 130 of FIG. 6 may respectively perform the same operations as the tree generator 110, the selector 120, and the detector 130 of FIG. 1.

The detector 130 acquires a winding number of a pixel selected by the selector 120 by detecting a tree generated by the tree generator 110. The detector 130 may detect the tree until reaching a leaf node on the basis of location information of the pixel, and may acquire a winding number allocated to the leaf node. If no winding number was allocated to the leaf node, the computation processor 140 may compute a winding number of the selected pixel and may allocate the computed winding number to the leaf node.

The rendering processor 150 determines whether to perform rendering with respect to the pixel based on the acquired winding number. The rendering processor 150 may perform a pixel ownership test to determine whether to perform rendering with respect to the pixel. The rendering processor 150 may confirm whether the winding number of the pixel satisfies a rendering fill rule.

As an example, the rendering processor 150 performs rendering with respect to a pixel if the winding number of the pixel is not 0. As another example, the rendering processor 150 performs rendering with respect to a pixel if the winding number of the pixel is an odd number. The rendering conditions described above are just examples, and the kind of conditions for rendering a pixel are not limited to those provided above.

Figure 7:
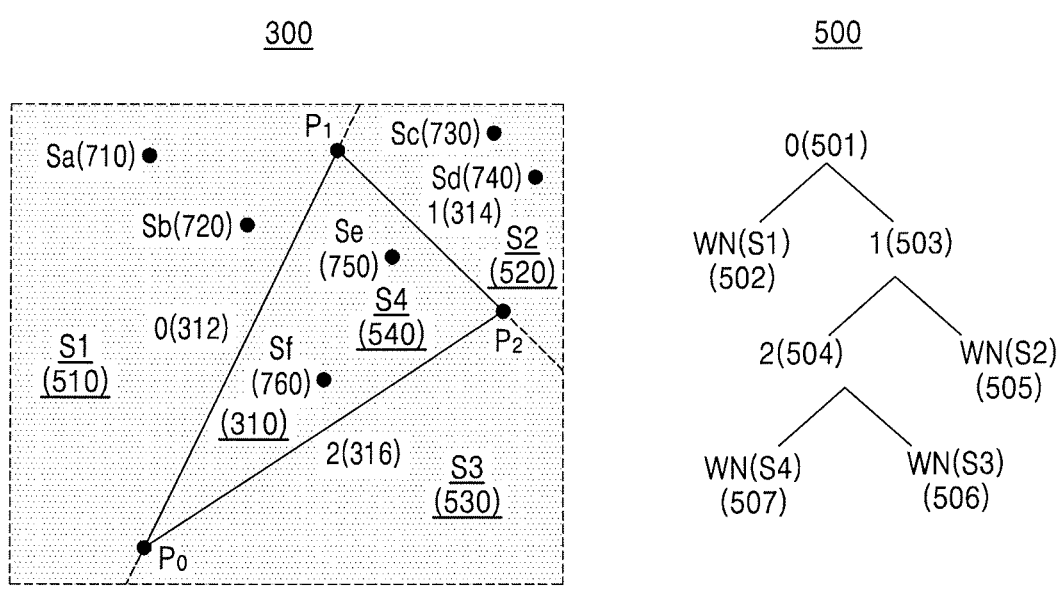
FIG. 7 is a drawing for explaining a method of obtaining a winding number of a pixel via a tree, according to an embodiment.

FIG. 7 is a drawing for explaining a method of acquiring a winding number of a pixel based on a tree, according to an embodiment. Referring to FIG. 7, the rendering apparatus 100 acquire winding numbers of pixels Sa (710), Sb (720), Sc (730), Sd (740), Se (750) and Sf (760) included in the space 300 via the tree 500. The rendering apparatus 100 may detect the tree 500 based on location information of the pixel Sa (710). In the root node 501, the rendering apparatus 100 compares the location of the pixel Sa (710) with that of the primitive 0 (312). Since the pixel Sa (710) is located on a left side of the primitive 0 (312), the rendering apparatus 100 detects the child node 502 on a left side of the root node 501. The visited node 502 is a leaf node having no child node, and thus, the rendering apparatus 100 acquires a winding number allocated to the leaf node.

When the rendering apparatus 100 visits each leaf node of a tree for the first time, the leaf node 502 may be vacant. This is a case in which a winding number is not yet allocated to the leaf node, and in this case, the rendering apparatus 100 computes a winding number of the pixel Sa (710). If a virtual half-line is drawn in a right side direction of the pixel Sa 710, the primitive 0 (312) and the primitive 1 (314) cross each other, and thus, the winding number of the pixel Sa (710) is 0. Accordingly, the rendering apparatus 100 allocates a winding number 0 to the node 502.

The rendering apparatus 100 may detect the tree 500 based on location information of the pixel Sb (720). Regarding the root node 501, the rendering apparatus 100 compares the location of the pixel Sb 720 with that of the primitive 0 (312). Since the pixel Sb (720) is located on a left side of the primitive 0 (312), the rendering apparatus 100 detects the child node 502 on a left side of the root node 501. Since a winding number 0 is already allocated to the node 502, the rendering apparatus 100 may acquire the winding number of the pixel Sb 720 as being 0 without performing a calculation process.

The rendering apparatus 100 may detect the tree 500 based on location information of the pixel Sc 730. Regarding the root node 501, the rendering apparatus 100 compares the location of the pixel Sc 730 with that of the primitive 0 (312). Since the pixel Sc 730 is located on a right side of the primitive 0 (312), the rendering apparatus 100 detects the child node 503 on a right side of the root node 501.

Regarding the node 503, the rendering apparatus 100 compares the location of the pixel Sc (730) with that of the primitive 1 (314). Since the pixel Sc (730) is located on a right side of the primitive 1 (314), the rendering apparatus 100 detects the child node 505 on a right side of the root node 503. The visited node 505 is a leaf node having no child node, and thus, the rendering apparatus 100 acquires a winding number allocated to the leaf node. However, since the leaf node 505 is vacant when the rendering apparatus 100 visits the leaf node of the tree for the first time, the rendering apparatus 100 may not acquire a winding number. In this case, the rendering apparatus 100 computes a winding number of the pixel Sc (730). If a virtual half-line is drawn in a right side direction of the pixel Sc (730), the virtual half-line does not cross any primitive, and thus, the winding number of the pixel Sc (730) is 0. The rendering apparatus 100 allocates a winding number 0 to the node 505.

The rendering apparatus 100 may detect the tree 500 based on location information of the pixel Sd (740). In the root node 501, the rendering apparatus 100 compares the location of the pixel Sd (740) with that of the primitive 0 (312). Since the pixel Sd (740) is located on a right side of the primitive 0 (312), the rendering apparatus 100 detects the child node 503 on a right side of the root node 501.

Regarding the node 503, the rendering apparatus 100 compares the location of the pixel Sd (740) with that of the primitive 1 (314). Since the pixel Sd (740) is located on a right side of the primitive 1 (314), the rendering apparatus 100 detects the child node 505 on a right side of the node 503. Since a winding number 0 is already allocated to the node 505, the rendering apparatus 100 acquires the winding number of the pixel Sd (740) as 0.

The rendering apparatus 100 may detect the tree 500 on the basis of location information of the pixel Se (750). Regarding the root node 501, the rendering apparatus 100 compares the location of the pixel Se (750) with that of the primitive 0 (312). Since the pixel Se (750) is located on a right side of the primitive 0 (312), the rendering apparatus 100 detects the child node 503 on a left side of the root node 501.

Regarding the node 503, the rendering apparatus 100 compares the location of the pixel Se (750) with that of the primitive 1 (314). Since the pixel Se (750) is located on a left side of the primitive 1 (314), the rendering apparatus 100 detects the child node 504 on a left side of the root node 503.

Regarding the node 504, the rendering apparatus 100 compares the location of the pixel Se (750) with that of the primitive 2 (316). Since the pixel Se (750) is located on a left side of the primitive 2 (316), the rendering apparatus 100 detects the child node 507 on a left side of the root node 504.

At the beginning of the method, the leaf node 507 may be a vacant node. In this case, the rendering apparatus 100 computes the winding number of the pixel Se (750). If a virtual half-line is drawn in a right side direction of the pixel Se (750), the pixel Se (750) crosses the primitive 1 (314), and thus, the winding number of the pixel Se (750) is +1. Accordingly, the rendering apparatus 100 allocates the winding number +1 to the node 507.

The rendering apparatus 100 may detect the tree 500 on the basis of location information of the pixel Sf (760). In the root node 501, the rendering apparatus 100 compares the location of the pixel Sf (760) with that of the primitive 0 (312). Since the pixel Sf (760) is located on a right side of the primitive 0 (312), the rendering apparatus 100 detects the child node 503 on a left side of the root node 501.

Since the pixel Sf (760) is located on a left side of the primitive 1 (314), the rendering apparatus 100 detects the child node 504 on a left side of the node 503. Also, since the pixel Sf (760) is located on a left side of the primitive 2 (316), the rendering apparatus 100 detects the child node 507 on a left side of the node 504. Since winding number +1 is allocated to the node 507, the rendering apparatus 100 acquires the winding number +1 of the pixel Sf (760).

FIGS. 8A through 8J are drawings for illustrating a method of generating a tree 850 when primitives that constitute a path intersect each other, according to an embodiment. For convenience of explanation, the primitive is divided into a plurality of primitives. However, when a tree is actually generated, it is unnecessary to store the primitive by dividing it into primitives. For example, referring to FIG. 8A, although a primitive 2 is divided into a primitive 2a and a primitive 2b, both the primitive 2a and the primitive 2b may indicate the primitive 2. Accordingly, the rendering apparatus 100 may generate a tree without dividing the primitive 2.

Figure 8A:
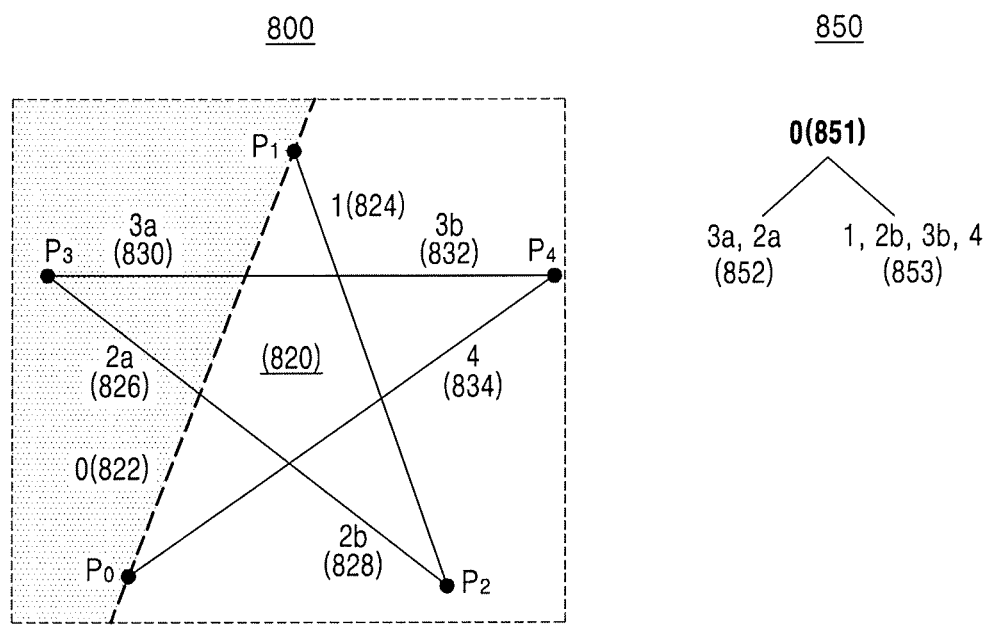
FIGS. 8A through 8J are drawings for illustrating generation of a tree when paths intersect each other, according to an embodiment.

Referring to FIG. 8A, the rendering apparatus 100 sets a space 800 that includes a path 820. The space 800 that includes the path 820 may denote a total frame or a bounding box that includes the path 820.

The rendering apparatus 100 allocates a primitive 0 (822), a primitive 1 (824), a primitive 2 including primitives 2a (826) and 2b (828), a primitive 3 including primitives 3a (830) and 3b (832), and a primitive 4 (834) to a root node 851 of the tree 850. The rendering apparatus 100 selects the primitive 0 (822) as the top priority primitive. Accordingly, the root node 851 corresponds to the primitive 0 (822).

Each of the primitives 2 and 3 intersects the primitive 0. Accordingly, for convenience of explanation, the primitive 2 is divided into the primitive 2a (826) and the primitive 2b (828), and the primitive 3 is divided into the primitive 3a (830) and the primitive 3b (832). However, each of the divided primitives may indicate the same primitive that is not actually divided. Also, regarding the tree 850, the primitive 2a (826) and the primitive 2b (828) and the primitive 3a (830) and the primitive 3b (832) may be respectively simply indicated as primitive 2 and primitive 3, but the primitives 2 and 3 are divided for convenience of explanation.

The rendering apparatus 100 allocates the primitive 3a (830) and the primitive 2a (826) located on a left side of the primitive 0 (822) to a child node 852 on a left side of the root node 851. Also, the rendering apparatus 100 allocates the primitive 1 (824), the primitive 2b (828), the primitive 3b (832), and the primitive 4 (834) to a child node 853 on a right side of the root node 851.

Figure 8B:
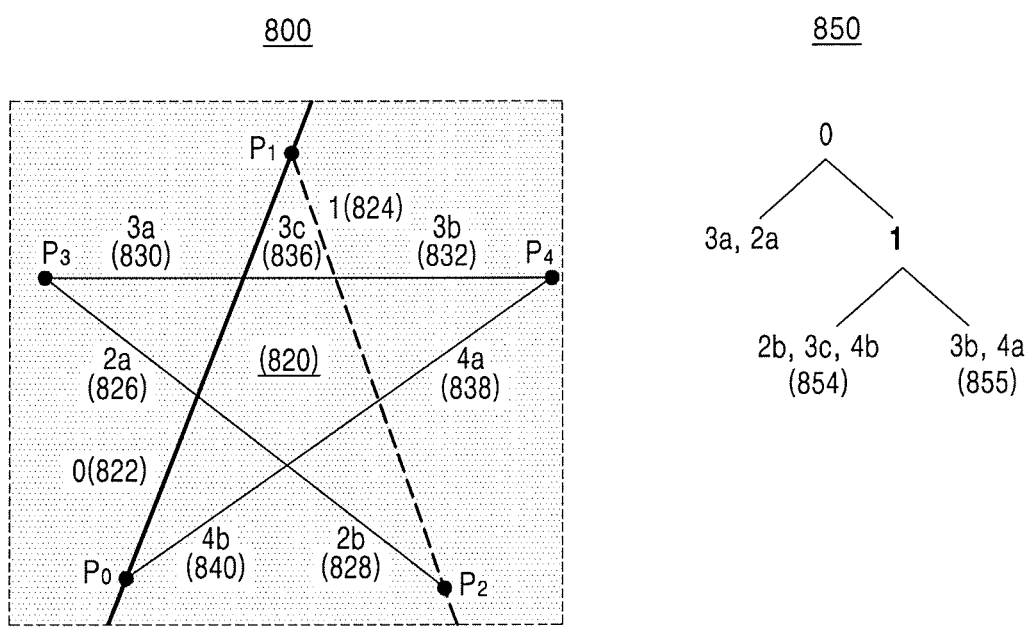

As shown in FIG. 8B, the rendering apparatus 100 selects the primitive 1 (824) as the top priority primitive of the mode 853. The rendering apparatus 100 allocates the primitive 2b (828), the primitive 3c (836), and the primitive 4b (840) that are located on a left side of the primitive 1 (824) to a child node 854 on a left side of the node 853. Also, the rendering apparatus 100 allocates the primitive 3b (832) and the primitive 4a (838) that are located on a right side of the primitive 1 (824) to a child node 855 on a right side of the node 853.

Figure 8C:
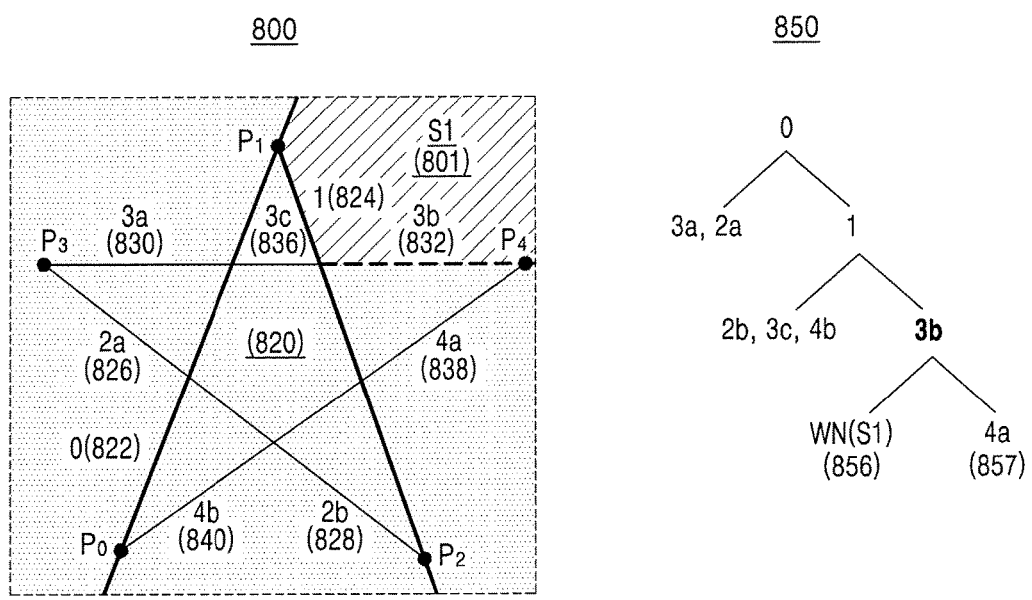

As shown in FIG. 8C, the rendering apparatus 100 selects the primitive 3b (832) as the top priority primitive of the node 855. The rendering apparatus 100 allocates the primitive 4a (838) to a child node 857 on a right side of the node 855. Also, since no primitive is present on an upper side of the primitive 3b (832), the rendering apparatus 100 sets a child node 856 on a left side of the node 855 as a vacant node. The node 856 corresponds to a space S1 (801).

Figure 8D:
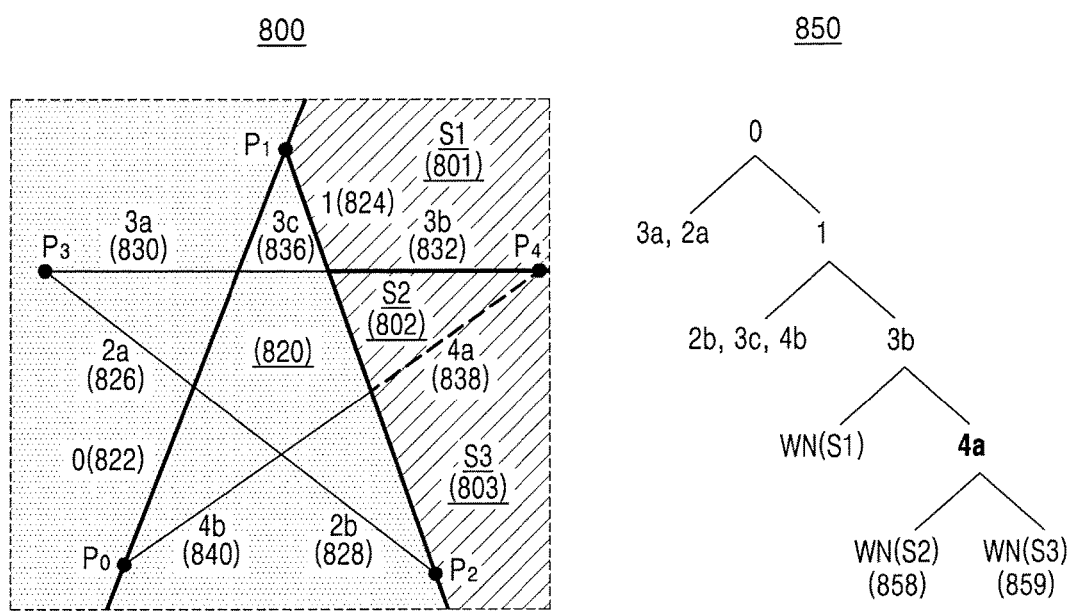

As shown in FIG. 8D, the rendering apparatus 100 selects the primitive 4a (838) as the top priority primitive of the node 857. Since no primitives are present on left and right sides of the primitive 4a (838), the rendering apparatus 100 sets a child node 856 on a left side of the node 857 and a child node 859 on a right side of the node 857 as vacant nodes. The node 858 and the node 859 may respectively correspond to a space S2 (802) and a space S3 (803).

Figure 8E:
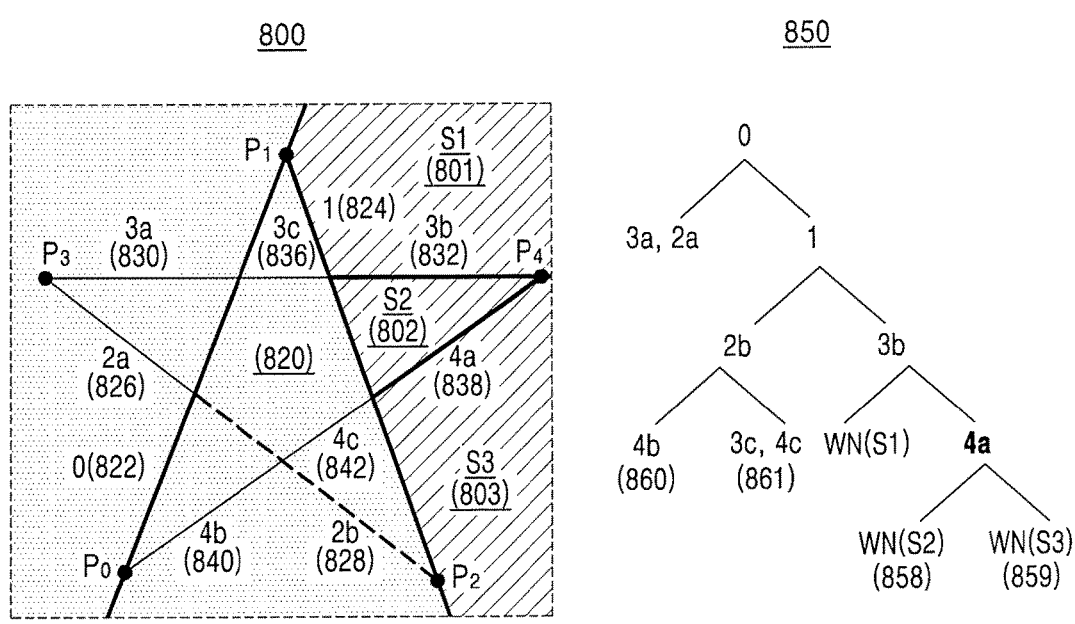

As shown in FIG. 8E, the rendering apparatus 100 selects the primitive 2b 828 as the top priority primitive of the node 854. The rendering apparatus 100 allocates the primitive 4b (840) locating on a left side of the primitive 2b (828) to a child node 860 on a left side of the node 854. Also, the rendering apparatus 100 allocates primitive 3c (836) and the primitive 4c (842) locating on a right side of the primitive 2b (828) to a child node 861 on a right side of the node 854.

Figure 8F:
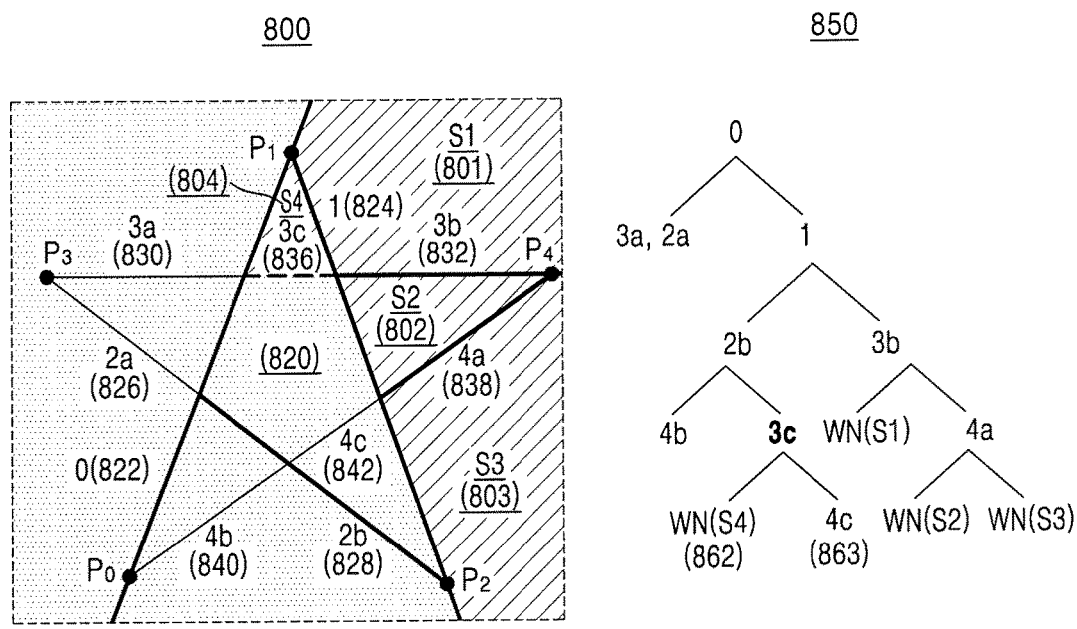

As shown in FIG. 8F, the rendering apparatus 100 selects the primitive 3c (836) as the top priority primitive of the node 861. The rendering apparatus 100 allocates the primitive 4c (842) locating on a lower side of the primitive 3c (836) to a child node 863 on a right side of the node 861. Also, since no primitive is present on an upper left side of the primitive 3c (836), the rendering apparatus 100 sets a child node 862 on a left side of the node 861 as a vacant node. The node 862 corresponds to a space S4 (804).

Figure 8G:
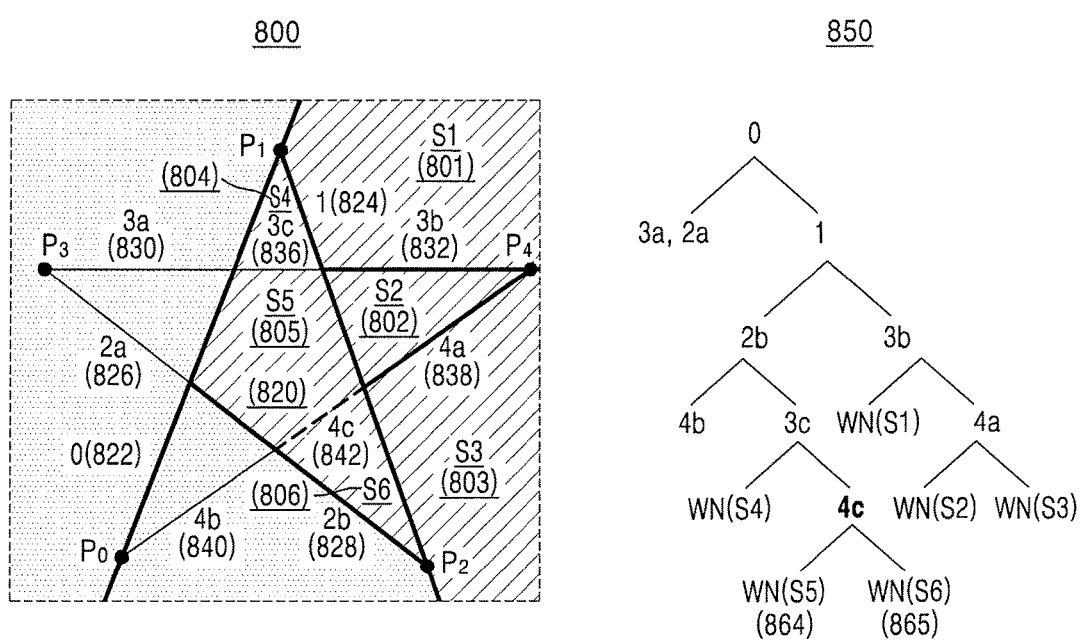

As shown in FIG. 8G, the rendering apparatus 100 selects the primitive 4c (842) as the top priority primitive of the node 863. Since there are no primitives on left and right side of the primitive 4c (842), the rendering apparatus 100 may set a child node 864 on a left side of the node 863 and a child node 865 on a right side of the node 863 as vacant nodes. The node 864 corresponds to a space S5 (805) and the node 865 corresponds to a space S6 (806).

Figure 8H:
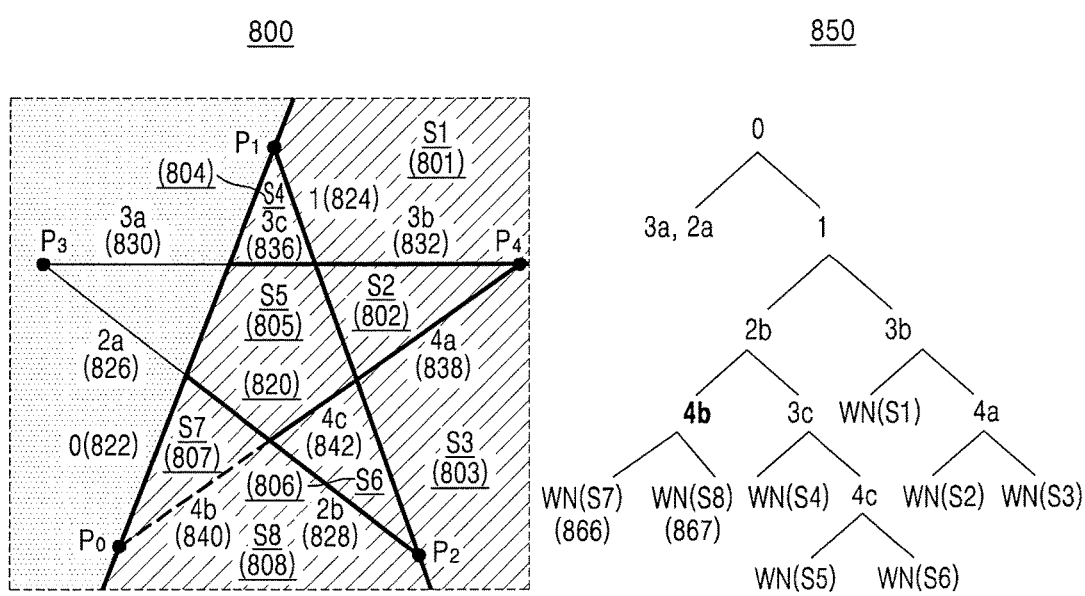

As shown in FIG. 8H, the rendering apparatus 100 selects the primitive 4b (840) as the top priority primitive of the node 860. Since there are no primitives on left and right side of the primitive 4b (840), the rendering apparatus 100 sets a child node 866 on a left side of the node 860 and a child node 867 on a right side of the node 860 as vacant nodes. The node 866 corresponds to a space S7 (807) and the node 867 corresponds to a space S8 (808).

Figure 8I:
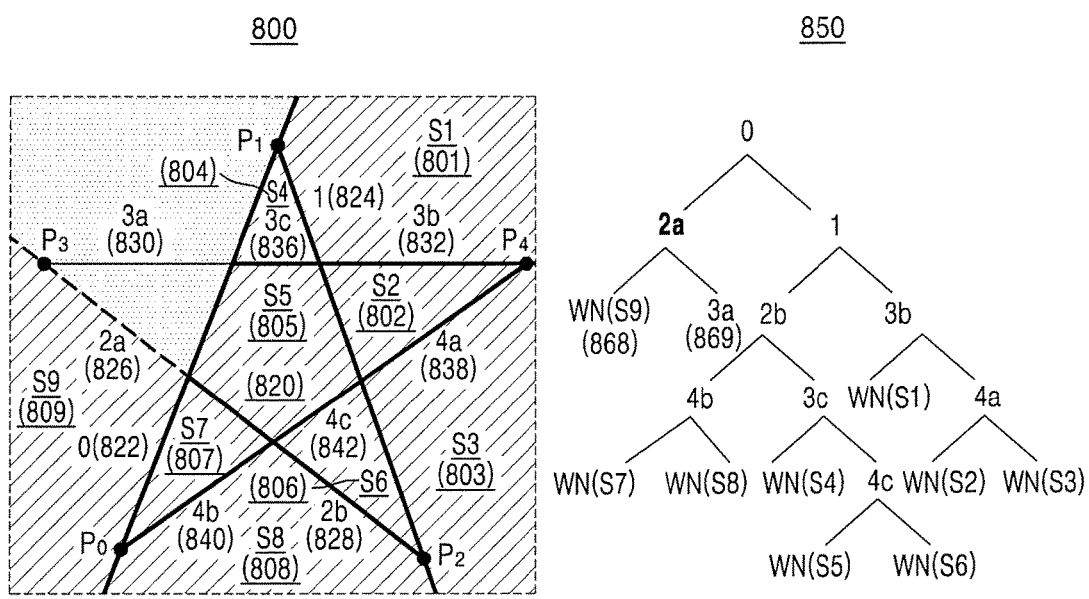

As shown in FIG. 8I, the rendering apparatus 100 selects the primitive 2a (826) as the top priority primitive of the node 852. The rendering apparatus 100 allocates the primitive 3a (830) locating on a right side of the primitive 2a (826) to a child node 869 on a right side of the node 852. Since no primitive is present on a left side of the primitive 2a (826), the rendering apparatus 100 sets a node 868 locating on a left side of the node 852 as a vacant node. The node 868 may correspond to a space S9 (809).

Figure 8J:
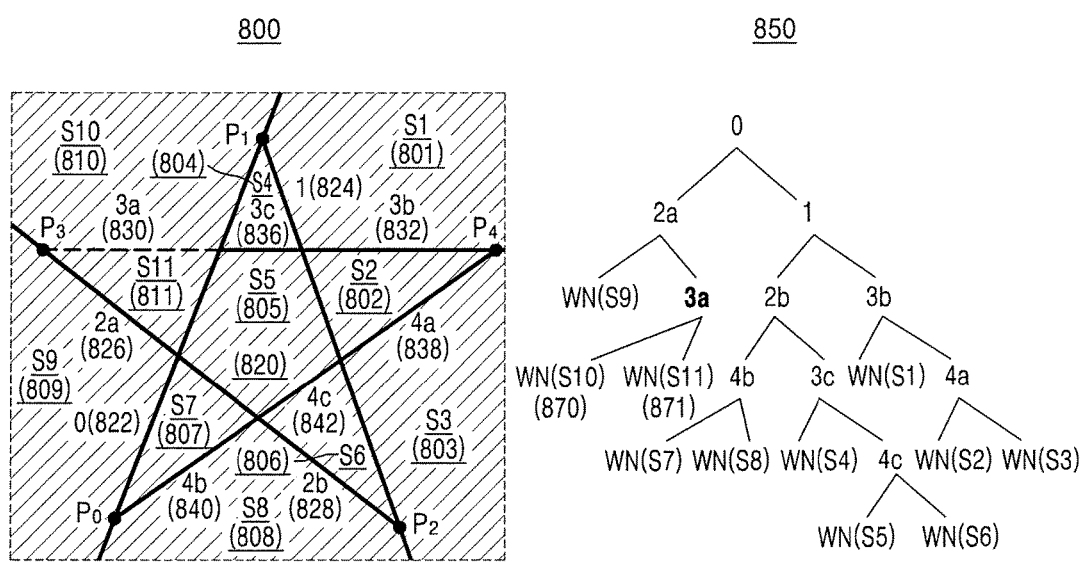

As shown in FIG. 8J, the rendering apparatus 100 selects the primitive 3a (830) as the top priority primitive of the node 869. Since there are no primitives on left and right sides of the primitive 3a (830), the rendering apparatus 100 sets a child node 870 on a left side of the node 869 and a child node 871 on a right side of the node 869 as vacant nodes. The node 870 corresponds to a space S10 (810) and the node 871 corresponds to a space S11 (811).

Figure 9:
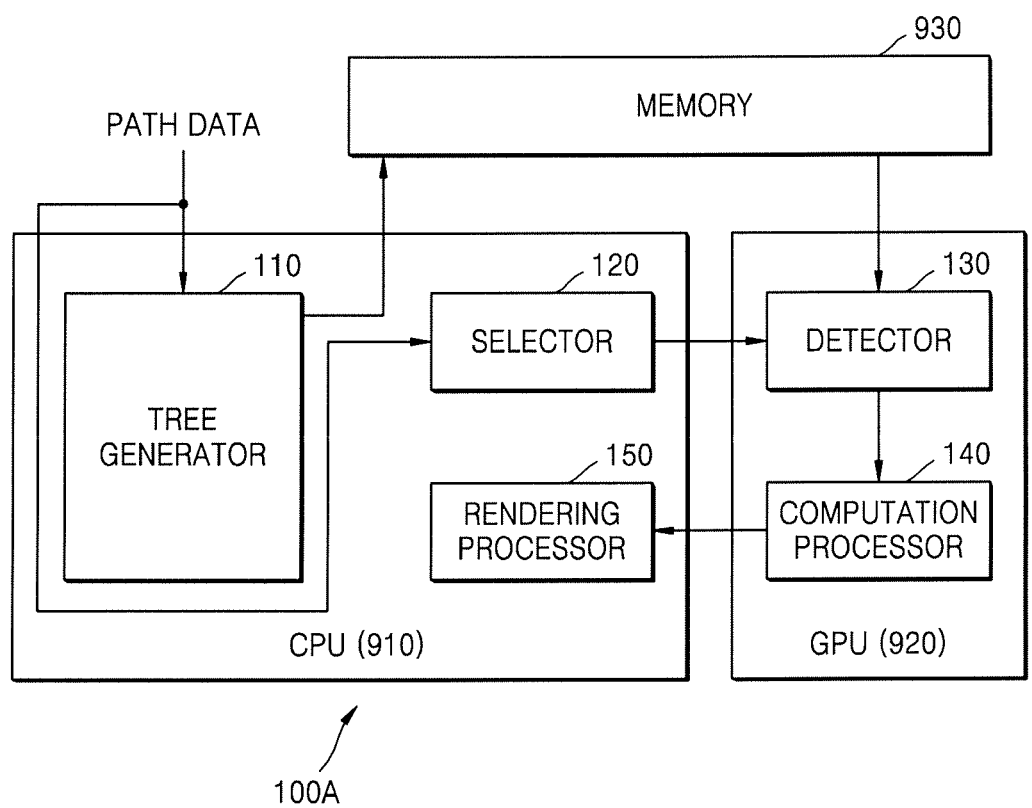
FIGS. 9 through 11 are block diagrams illustrating methods of performing functions of a central processing unit (CPU) and a graphic processing unit (GPU) included in a rendering apparatus, according to embodiments.
Figure 10:
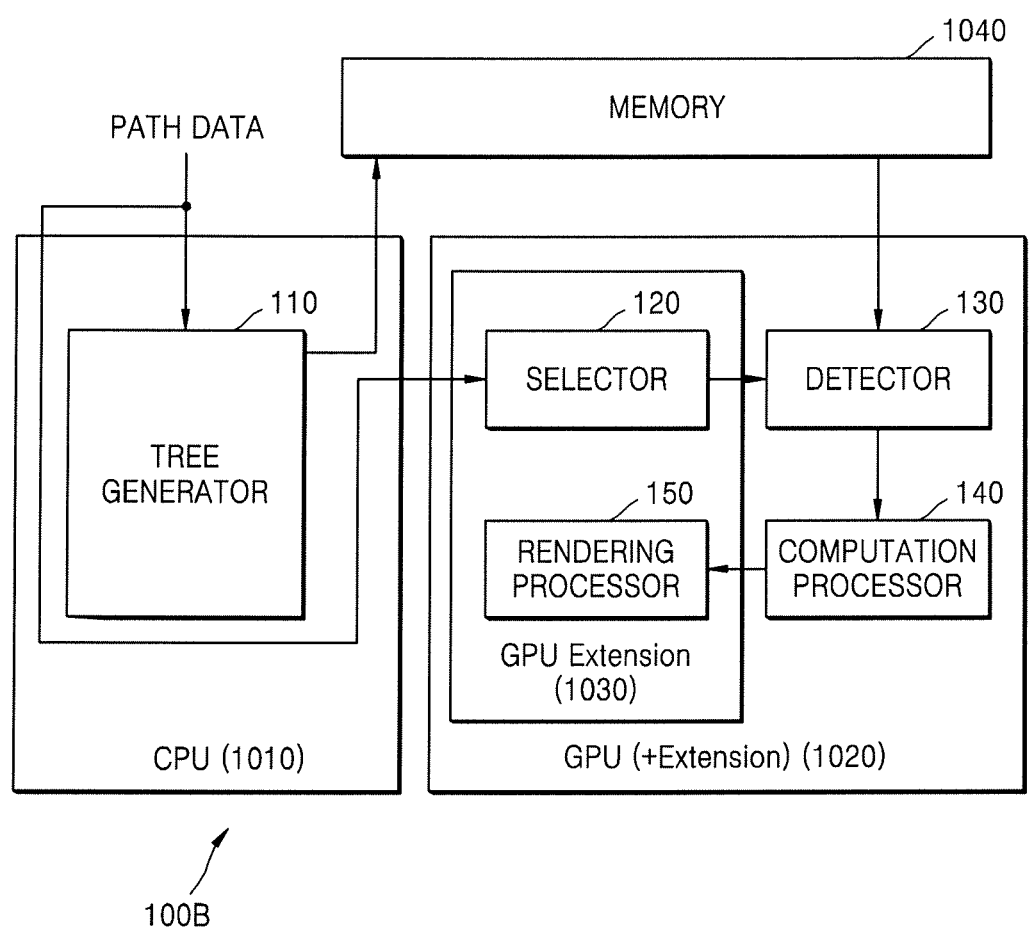
Figure 11:
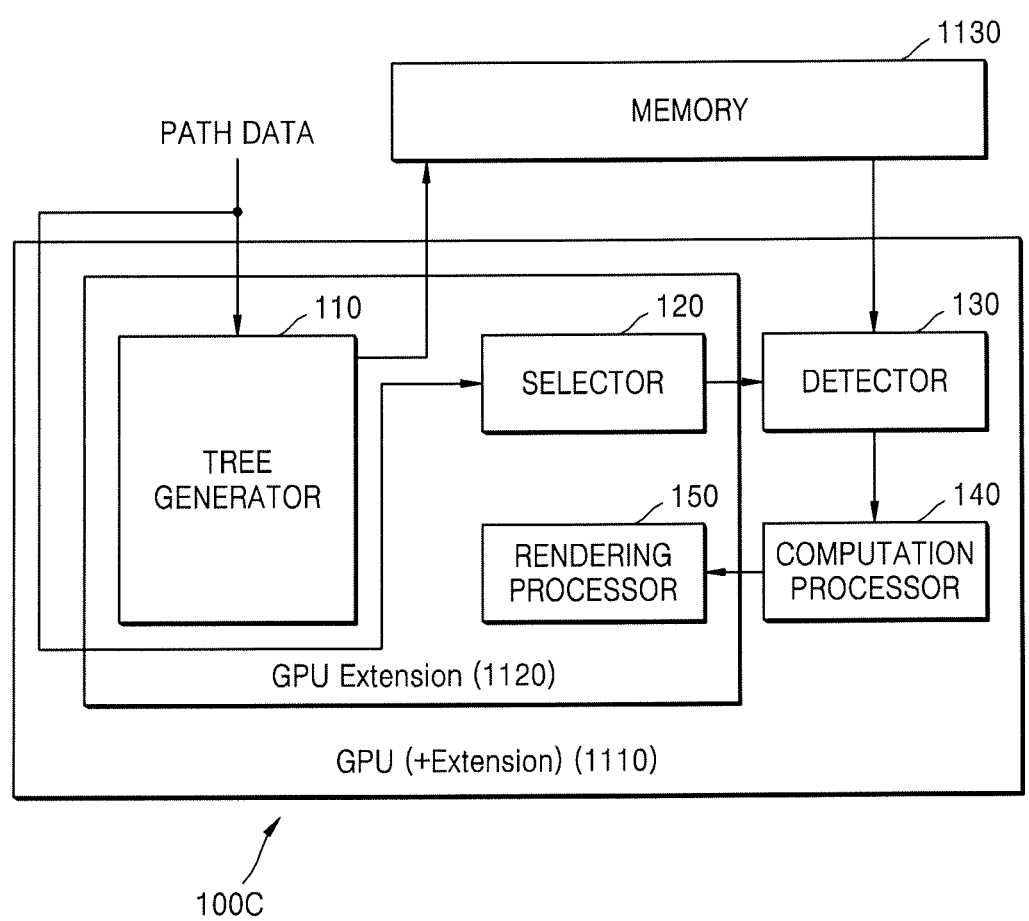

FIGS. 9 through 11 are block diagrams illustrating methods of performing functions of a central processing unit (CPU) and a graphic processing unit (GPU) included in a rendering apparatus, according to various embodiments. A tree generator 110, a selector 120, a detector 130, a computation processor 140, and a rendering processor 150 depicted in FIGS. 9 through 11 may respectively correspond to the tree generator 110, the selector 120, the detector 130, the computation processor 140, and the rendering processor 150 depicted in FIG. 6.

The rendering apparatuses illustrated in FIGS. 9 through 11 may include one or more processors included in a CPU. Also, the rendering apparatuses may include one or more processors included in a GPU. According to another embodiment, the rendering apparatus may include one or more processors included in a CPU and one or more processors included in a GPU.

Referring to FIG. 9, a rendering apparatus 100A according to an embodiment includes a CPU 910, a GPU 920, and a memory 930. Each of the tree generator 110, the selector 120, and the rendering processor 150 includes one or more processors included in the CPU 910. Each of the detector 130 and the computation processor 140 may include one or more processors included in the GPU 920.

The tree generator 110 generates a tree corresponding to spaces partitioned by primitives that constitute a path, based on path data. The tree generator 110 stores the generated tree in the memory 930. The selector 120 generates a sample that includes pixels to be rendered based on the path data.

The detector 130 detects a tree stored in the memory 930 in the GPU 920 via threads. The threads may be processed in parallel, and thus, the detector 130 may simultaneously detect nodes, respectively corresponding to pixels, via the threads. Likewise, the computation processor 140 may simultaneously compute winding numbers of each of the pixels via the threads in the GPU 920.

The rendering apparatus 100A computes and allocates winding numbers of pixels corresponding to all of the leaf nodes after generating a tree. In this case, winding numbers of all pixels may be acquired by the detector 130 while the rendering apparatus 100A is operating. In this case, the detector 130 includes one or more processors included in the GPU 920.

Referring to FIG. 10, a rendering apparatus 100B according to an embodiment includes a CPU 1010, a GPU 1020, a GPU extension 1030, and a memory 1040.

The tree generator 110 includes one or more processors included in the CPU 1010. Each of the selector 120, the detector 130, the computation processor 140, and the rendering processor 150 includes one or more processors included in the GPU 1020. In this case, the GPU extension 1030 extended for configuring the selector 120 and the rendering processor 150 is included in the GPU 1020. The GPU extension 1030 includes one or more processors to perform functions of the selector 120 and the rendering processor 150.

Referring to FIG. 11, a rendering apparatus 100C according to an embodiment includes a memory 1130, a GPU 1110, and an extended GPU 1120 included in the GPU 1110.

Each of the tree generator 110, the selector 120, the detector 130, the computation processor 140, and the rendering processor 150 includes one or more processors included in the GPU 1110. In this case, the GPU 1110 additionally includes the extended GPU 1120 to implement the tree generator 110, the selector 120, and the rendering processor 150. The extended GPU 1120 includes one or more processors to perform functions of the tree generator 110, the selector 120, and the rendering processor 150.

The tree generator 110, the selector 120 and the detector 130, the computation processor 140, the rendering processor 150, the CPU 910, the GPU 920, the memory 930, the CPU 1010, the GPU (+ Extension) 1020, the memory 1040, the GPU extension 1120 and the memory 1130 in FIGS. 1, 6 and 9-11 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2-5D and 7-11 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of rendering an object comprising a path formed by a primitive, the method comprising:
    executing, by one or more processors, operations comprising:
    generating a tree corresponding to spaces partitioned by the primitive, wherein the primitive includes a part of the path or an extension of a line of the path;
    selecting a pixel from the partitioned spaces;
    acquiring a winding number of the selected pixel by detecting the tree, wherein the winding number corresponds to a leaf node of the tree comprising plurality of pixels, and
    determining whether to perform rendering with respect to the selected pixel based on the acquired winding number.

2. The method of claim 1, wherein the acquiring of the winding number of the selected pixel comprises:
    detecting, based on location information of the selected pixel, the tree until the leaf node is reached; and
    acquiring a winding number allocated to the leaf node.

3. The method of claim 2, wherein the acquiring of the winding number allocated to the leaf node comprises:
    computing a winding number of the selected pixel; and
    allocating the computed winding number to the leaf node.

4. The method of claim 2, wherein the detecting of the tree comprises detecting, based on location information of the selected pixel, a node corresponding to a space including the selected pixel.

5. The method of claim 1, wherein the generating of the tree comprises generating a binary space partitioning tree (BSP Tree) corresponding to the spaces partitioned by the primitive.

6. The method of claim 5, wherein the generating of the tree comprises:
partitioning a space comprising the object based on a first primitive in the primitive;
generating a node corresponding to the first primitive; and adding the node to the tree.

7. The method of claim 6, wherein the generating of the tree comprises, in response to the partitioned space excluding another primitive:
generating a node corresponding to the partitioned space; and
adding the node corresponding to the partitioned space to the tree.

8. The method of claim 7, further comprising:
computing a winding number of an arbitrary pixel from the partitioned space; and
allocating the winding number of the arbitrary pixel to the node corresponding to the partitioned space.

9. A non-transitory computer-readable medium storing instructions that, when executed by a processor, cause the processor to perform the method of claim 1.

10. A rendering apparatus to render an object comprising a path formed by a plurality of primitives, the rendering apparatus comprising:
a tree generator configured to partition a space including the object based on the plurality of primitives, wherein each of the plurality of primitives includes a part of the path or an extension of a line of the path;
a selector configured to generate a sample of pixels to be rendered, wherein the rendering apparatus is configured to process the sample of pixels in parallel; and
a detector configured to acquire a winding number of each pixel of the sample based at least in part on the partitioned space, wherein the winding number corresponds to a portion of the partitioned space comprising a plurality of pixels.

11. The rendering apparatus of claim 10, wherein the detector is further configured to detect a tree until a leaf node is reached and acquire a winding number allocated to the leaf node based on location information of each pixel of the sample.

12. The rendering apparatus of claim 11, further comprising:
a computation processor configured to allocate the winding number to the leaf node by computing a winding number of each pixel of the sample and allocating the computed winding number to the leaf node.

13. The rendering apparatus of claim 12, further comprising:
a central processing unit (CPU) comprising any one or any combination of two or more of a tree generator, a selector, a detector, and a computation processor.

14. The rendering apparatus of claim 11, wherein the detector is further configured to detect a node corresponding to a space comprising each pixel of the sample based on location information of the pixel.

15. The rendering apparatus of claim 10, further comprising:
a GPU comprising any one or any combination of two or more of a tree generator, a selector, a detector, and a calculator.

16. The rendering apparatus of claim 10, wherein the tree generator is further configured to select a first primitive in the plurality of primitives, generate a node corresponding to the first primitive, and add the node to a tree.

17. The rendering apparatus of claim 16, wherein the tree generator is further configured to generate a node corresponding to the partitioned space and add the node corresponding to the partitioned space to a tree in response to the partitioned space comprising another primitive.

18. The rendering apparatus of claim 17, further comprising:
a computation processor configured to compute a winding of an arbitrary pixel from the partitioned space and allocate the winding number of the arbitrary pixel to the node corresponding to the partitioned space.

19. The rendering apparatus of claim 10, further comprising:
a rendering processor configured to determine whether to perform rendering with respect to each pixel of the sample based on the acquired winding number.

* * * * *